United States Patent
Martyn

(10) Patent No.: US 7,356,823 B2
(45) Date of Patent: *Apr. 8, 2008

(54) METHOD FOR DISPLAYING SINGLE MONITOR APPLICATIONS ON MULTIPLE MONITORS DRIVEN BY A PERSONAL COMPUTER

(75) Inventor: Tom C. Martyn, Seattle, WA (US)

(73) Assignee: ATI Technologies Inc., Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/967,444

(22) Filed: Oct. 18, 2004

(65) Prior Publication Data

US 2005/0050554 A1  Mar. 3, 2005

Related U.S. Application Data

(63) Continuation of application No. 09/755,549, filed on Jan. 3, 2001, now Pat. No. 6,823,525.

(60) Provisional application No. 60/177,746, filed on Jan. 21, 2000.

(51) Int. Cl.
G06F 9/44 (2006.01)

(52) U.S. Cl. .................... 719/323; 345/545

(58) Field of Classification Search ........... 719/323, 719/321, 310; 345/536–539, 561–562, 564, 345/530, 545
See application file for complete search history.

(56) References Cited

U.S. PATENT DOCUMENTS

| | | | |
|---|---|---|---|
| 4,870,406 A * | 9/1989 | Gupta et al. ............ 345/506 |
| 4,980,678 A | 12/1990 | Zenda |
| 4,990,902 A | 2/1991 | Zenda |
| 4,990,904 A | 2/1991 | Zenda |
| 5,018,076 A * | 5/1991 | Johary et al. ............ 345/573 |
| 5,107,251 A | 4/1992 | Frank et al. |
| 5,140,687 A * | 8/1992 | Dye et al. ............... 703/23 |
| 5,218,274 A | 6/1993 | Zenda |
| 5,218,699 A | 6/1993 | Brandle et al. |
| 5,247,676 A | 9/1993 | Ozur et al. |
| 5,283,856 A | 2/1994 | Gross et al. |

(Continued)

OTHER PUBLICATIONS

N. Thompson, "Ride the WinG for Speedy Graphics", MSDN, Sep. 1994, pp. (4).*

(Continued)

*Primary Examiner*—Van H. Nguyen
(74) *Attorney, Agent, or Firm*—Vedder Price P.C.

(57) ABSTRACT

A direct access driver solves limitations of DirectX operation under the Microsoft architecture when using multiple monitors. The direct access driver allows applications employing DirectX application program interfaces to use hardware acceleration without display errors on the monitors. Display errors can occur if multiple frame buffer addresses are returned in response to "GetFrameBufferAddress" DirectX calls. A single address is returned for two or more frame buffers on a display driver card by performing, without the DirectX application's knowledge, background operations that track hardware acceleration demands from two or more graphic user interfaces and frame buffers. The background operations entail constantly changing the frame buffer pointers relative to the location of offscreen DirectX application data, while one or more DirectX applications are moved in the display space from monitor to monitor.

10 Claims, 1 Drawing Sheet

U.S. PATENT DOCUMENTS

| | | | |
|---|---|---|---|
| 5,293,485 A | | 3/1994 | Zenda |
| 5,321,423 A | * | 6/1994 | Yoshizawa et al. .......... 715/526 |
| 5,361,078 A | | 11/1994 | Caine |
| 5,388,200 A | * | 2/1995 | McDonald et al. .......... 715/803 |
| 5,420,980 A | * | 5/1995 | Pinedo et al. ................ 345/566 |
| 5,430,457 A | | 7/1995 | Zenda |
| 5,432,900 A | * | 7/1995 | Rhodes et al. ............ 715/500.1 |
| 5,508,714 A | | 4/1996 | Zenda |
| 5,559,525 A | | 9/1996 | Zenda |
| 5,564,009 A | * | 10/1996 | Pinedo et al. ................ 345/562 |
| 5,574,836 A | * | 11/1996 | Broemmelsiek ............ 345/427 |
| 5,581,766 A | * | 12/1996 | Spurlock ........................ 713/2 |
| 5,592,187 A | | 1/1997 | Zenda |
| 5,629,715 A | | 5/1997 | Zenda |
| 5,694,141 A | | 12/1997 | Chee |
| 5,696,947 A | * | 12/1997 | Johns et al. ................ 345/537 |
| 5,745,762 A | * | 4/1998 | Celi, Jr. et al. ............. 719/323 |
| 5,764,201 A | | 6/1998 | Ranganathan |
| 5,764,228 A | * | 6/1998 | Baldwin ...................... 715/797 |
| 5,784,035 A | * | 7/1998 | Hagiwara et al. ............ 345/1.3 |
| 5,801,720 A | * | 9/1998 | Norrod et al. ............... 345/568 |
| 5,835,090 A | | 11/1998 | Clark et al. ................. 345/339 |
| 5,838,334 A | * | 11/1998 | Dye ............................ 345/503 |
| 5,841,418 A | | 11/1998 | Bril et al. |
| 5,841,435 A | * | 11/1998 | Dauerer et al. ............. 715/775 |
| 5,870,108 A | * | 2/1999 | Chen et al. ................. 345/545 |
| 5,874,928 A | | 2/1999 | Kou |
| 5,923,307 A | * | 7/1999 | Hogle, IV ...................... 345/4 |
| 5,929,868 A | * | 7/1999 | Howard et al. ............. 345/545 |
| 5,949,437 A | * | 9/1999 | Clark ......................... 345/502 |
| 5,963,192 A | | 10/1999 | Wong et al. |
| 5,982,384 A | * | 11/1999 | Prouty et al. ............... 345/441 |
| 5,990,912 A | * | 11/1999 | Swanson .................... 345/568 |
| 6,018,340 A | | 1/2000 | Butler et al. |
| 6,020,863 A | | 2/2000 | Taylor |
| 6,046,753 A | * | 4/2000 | Searby et al. ............... 345/537 |
| 6,049,316 A | | 4/2000 | Nolan et al. |
| 6,061,064 A | * | 5/2000 | Reichlen ..................... 345/418 |
| 6,091,432 A | * | 7/2000 | Diehl et al. ................. 345/562 |
| 6,097,401 A | * | 8/2000 | Owen et al. ................ 345/562 |
| 6,104,359 A | | 8/2000 | Endres et al. |
| 6,104,414 A | | 8/2000 | Odryna et al. |
| 6,154,225 A | | 11/2000 | Kou et al. |
| 6,239,810 B1 | * | 5/2001 | Van Hook et al. .......... 345/420 |
| 6,240,468 B1 | * | 5/2001 | Capelli ........................ 710/14 |
| 6,297,817 B1 | * | 10/2001 | Larson et al. ............... 345/213 |
| 6,351,261 B1 | * | 2/2002 | Reichlen et al. ............ 345/427 |
| 6,411,302 B1 | * | 6/2002 | Chiraz ........................ 345/545 |
| 6,510,470 B1 | * | 1/2003 | Capelli ........................ 719/323 |
| 6,573,913 B1 | | 6/2003 | Butler et al. |
| 6,597,364 B1 | * | 7/2003 | Chiu et al. .................. 345/562 |
| 6,667,745 B1 | * | 12/2003 | Hussain ....................... 345/545 |
| 6,823,525 B1 | * | 11/2004 | Martyn ....................... 719/323 |
| 6,853,381 B1 | * | 2/2005 | Grigor et al. ............... 345/531 |

OTHER PUBLICATIONS

S. Diehl, "Window 95 Graphics Architecture", BYTE magazine, Jun. 1995, pp. (4).*

Civaniar et al "Image Processing Evaluatiion for DSP Based parallel Computers with Distributed Frame Buffers", 1990 IEEE, pp. 993-996.*

"AppianDX: A Solution for DirectX Display Across Multiple Monitors," an in-house white paper by Lisa Epstein, Sr. Product Manager, Appian Graphics, undated, pp. 1-3.

"What is DirectX?", printed from www.microsoft.com/directx/pavilion/general/whatisdx.htm, MicroSoft, Inc., Redmond, WA, Dec. 22, 1998, pp. 1-3.

* cited by examiner

METHOD FOR DISPLAYING SINGLE MONITOR APPLICATIONS ON MULTIPLE MONITORS DRIVEN BY A PERSONAL COMPUTER

RELATED APPLICATIONS

This application is a continuation of U.S. application Ser. No. 09/755,549, entitled "METHOD FOR DISPLAYING SINGLE MONITOR APPLICATIONS ON MULTIPLE MONITORS DRIVEN BY A PERSONAL COMPUTER," filed Jan. 3, 2001, now U.S. Pat. No. 6,823,525 hereby incorporated by reference herein and which claims priority from U.S. Provisional Application No. 60/177,746, filed Jan. 21, 2000, entitled "METHOD FOR DISPLAYING SINGLE MONITOR APPLICATIONS ON MULTIPLE MONITORS DRIVEN BY A PERSONAL COMPUTER".

FEDERALLY SPONSORED RESEARCH OR DEVELOPMENT

Not applicable.

COMPUTER PROGRAM LISTING APPENDIX

A preferred embodiment of this invention is described in C language source code program files named DDMulti.c and DDMulti.h, which are incorporated herein by reference and copies of which are stored on each of two identical appended CD-R compact disks labeled "Copy 1" and "Copy 2" that were created Oct. 23, 2000. On each disk, the file named "DDMulti.c" was created Jul. 6, 1999 and contains 44,620 bytes and the file named "DDMulti.h" was created Jul. 6, 1999 and contains 3,265 bytes.

TECHNICAL FIELD

This invention relates to computer systems employing a graphical user interface ("GUI") operating system and, in particular, to a method for driving multiple monitors from application programs that are, otherwise, limited to driving a single monitor.

BACKGROUND OF THE INVENTION

Computer systems now commonly include GUI operating systems that employ graphical objects, such as icons, windows, and dialog boxes, to prompt and receive user input. A user typically enters information by positioning a cursor within a designated area of a graphical desktop—e.g., by using a mouse, trackball, finger, stylus, direction keys or the like—to implement a desired function. GUI operating systems, such as MicroSoft® Windows®, have gained widespread acceptance because of their simple, intuitive operation and because they allow easy movement between multiple applications programs.

GUI users have responded to this flexible usability by demanded operating systems with enhanced desktop functionality, i.e., an operating system working area larger than the display area of a single monitor. One way of implementing an enhanced desktop is by utilizing multiple monitors or by employing a virtual desktop area where the display area of a single monitor can be "scrolled" across a larger graphical desktop. Such enhanced desktop systems achieve greater display capability without the expense or inconvenience of a single, larger monitor. Unfortunately, prior GUI operating systems were not specifically adapted for multiple monitor enhanced desktop operation and were often highly hardware dependent.

Solutions to the multiple monitor enhanced desktop problems are described in U.S. Pat. No. 5,835,090 for DESKTOP MANAGER FOR GRAPHICAL USER INTERFACE BASED SYSTEM WITH ENHANCED DESKTOP, which is assigned to the assignee of this application and is incorporated herein by reference. However, GUI operating systems and graphics-intensive applications running on them require considerable computer processing power. Indeed, the performance demands of users and graphic application developers have outstripped the performance capabilities of most processors, especially when operating a multiple monitor GUI operating system.

MicroSoft® has addressed many of the performance aspects of application programs by developing the DirectX® family of application program interfaces ("APIs"), which provide Windows-based software applications with direct access to display hardware resources. DirectX provides developers with a common set of instructions and software "components" that allow applications, such as multimedia applications, to run on any Windows-based personal computer ("PC") while ensuring that the applications take full advantage of any high-performance hardware capabilities to achieve the best possible performance.

DirectX® includes a wide variety of multimedia enabling technologies including DirectDraw®, Direct3D®, DirectInput®, DirectSound®, DirectPlay®, DirectMusic™, DirectShow™, and DirectAnimation™ to optimize the displaying graphics and video information. The DirectX Foundation layer components, DirectDraw and Direct3D, are of general importance, and the Media layer component, DirectShow, is importance for displaying graphics and video, particularly streaming video applications. In general, DirectX components have enabled the development of a new generation of high-performance gaming and video applications through the use of DirectDraw, Direct3D, and DirectShow calls.

Unfortunately, DirectX APIs running under Windows 95 and Windows NT 4.0 assume a single display monitor and are, therefore, incompatible with systems driving multiple monitors. More specifically, DirectX and applications written to DirectX, assume that only one graphics frame buffer is available for driving the single monitor. In DirectX, a complex sequence of calls (simply referred to hereafter as "GetFrameBufferAddress") allow DirectX applications to locate and access the single frame buffer. Graphic device drivers must support the GetFrameBufferAddress calls because they are used to write data directly into frame buffer memory, bypassing the typical Graphic Device Interface ("GDI") and, thereby, providing accelerated performance.

However, the graphics device driver can return only a single frame buffer address in response to the GetFrameBufferAddress calls, and most multiple monitor driver cards employ two or more frame buffers to implement multiple monitor displays. This begs the question, which of the two addresses does the multiple monitor device driver return? If the driver returns the address of the first frame buffer and the DirectX application is displaying through another frame buffer, or vice versa, display errors will occur. The alternative is to sacrifice hardware acceleration and employ the GDI to perform DirectX operations with processor resources, which dramatically increases processor utilization and decreases performance.

SUMMARY OF THE INVENTION

An object of this invention is, therefore, to provide a method for providing application programs with direct access to multiple display monitors running under a GUI operating system.

Another object of this invention is to provide a multiple monitor operating environment for applications employing MicroSoft® DirectX® APIs.

A further object of this invention is to provide a multiple monitor operating environment for DirectX® applications running under the MicroSoft® Windows® operating system.

A direct access driver of this invention solves the limitations of DirectX operation under the Microsoft architecture when using multiple monitors. The direct access driver allows applications employing DirectX APIs to employ hardware acceleration without display errors on any of the multiple monitors. As described in the background of this invention, display errors can occur if multiple frame buffer addresses are returned in response to "GetFrameBufferAddress" DirectX calls. The direct access driver of this invention returns a single address for two or more frame buffers on a display driver card by performing, without the DirectX application's knowledge, background operations that track the demand for hardware acceleration from two or more GUIs and frame buffers. The background operations entail constantly changing the frame buffer pointers relative to the location of offscreen DirectX application data, while one or more DirectX applications are moved in the display space from monitor to monitor. This is analogous to accurately tracking one of many moving objects in an extremely fast-moving shell game.

Additional objects and advantages of this invention will be apparent from the following detailed description of a preferred embodiment thereof that proceeds with reference to the accompanying drawing.

DETAILED DESCRIPTION OF A PREFERRED EMBODIMENT

Figure 1:
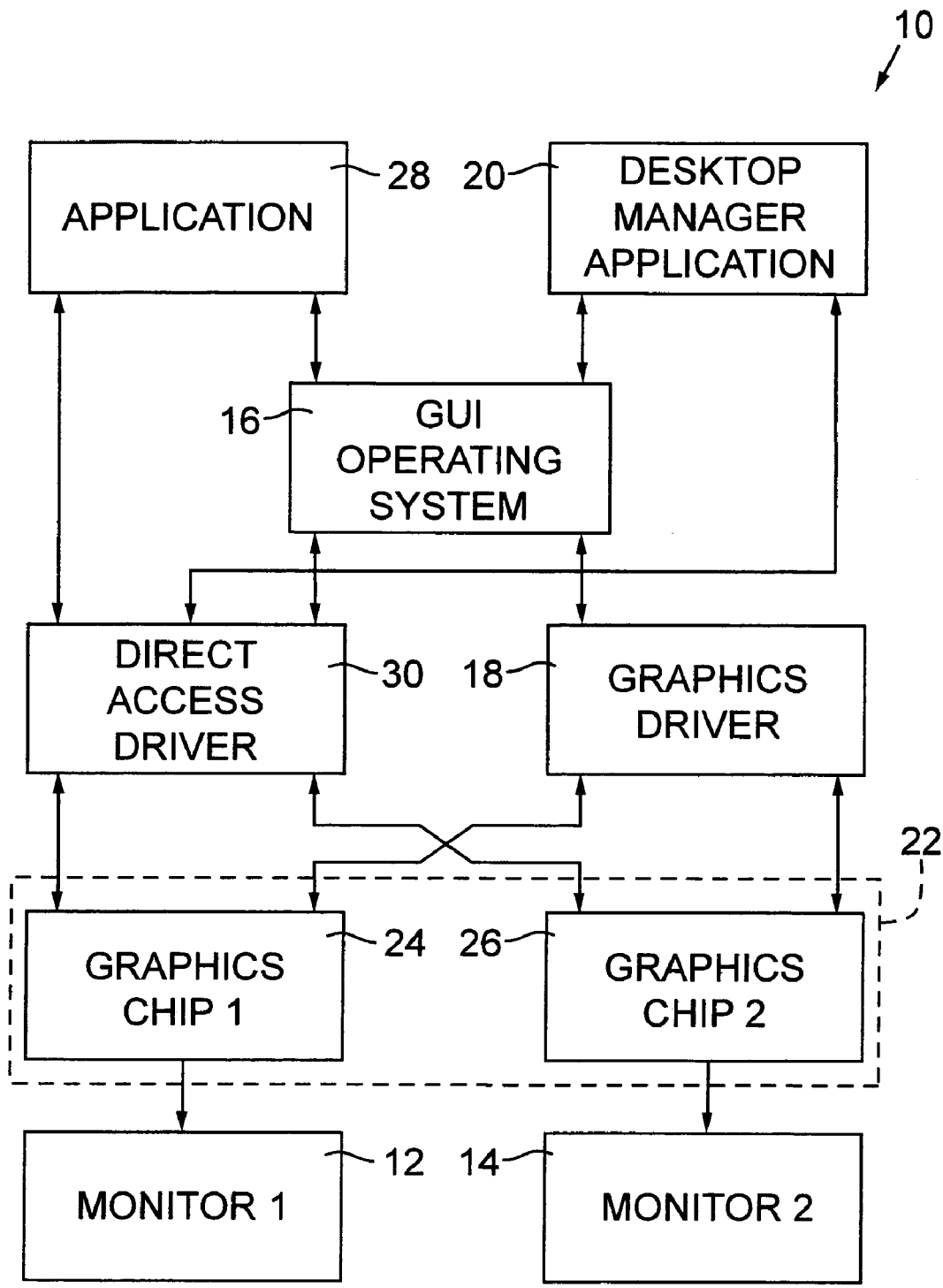
FIG. 1 is a simplified schematic block diagram of a multiple monitor computer system suitable for use with this invention.

This invention is directed to displaying graphical objects on multiple monitors in a computer system including a single monitor-aware GUI operating system and is particularly beneficial for systems including an enhanced desktop and direct access APIs. In the following description, the invention is preferably set forth in the context of the WINDOWS® operating systems and DirectX® APIs that are available from Microsoft® Corporation of Redmond, Wash. It will be appreciated, however, that the specific implementations of this invention set forth below are exemplary and this invention is not limited to the specifically described functions or operating environment.

FIG. 1 shows a multiple monitor computer system 10 of this invention. Although more monitors may be employed in accordance with this invention, the illustrated system 10 includes first and second monitors 12 and 14. System 10 further includes: a GUI operating system 16, a graphics driver application 18, and a desktop manager application 20 (which may be combined into a single application); and a graphics card 22 including graphics chips 24 and 26 for operating respective monitors 12 and 14. Graphics chips 24 and 26 may be, for example, type GD5434 chips manufactured by Cirrus Logic. Any compatible graphics driver logic may be employed. Skilled workers will recognize that system 10 includes additional elements that are not shown, such as a central processing unit ("CPU"), input/output ("I/O") busses, and static and dynamic memory. As can be appreciated by persons skilled in the art, static and dynamic memory include computer readable medium on which computer software can be stored. The stored software may include software that when loaded at computer 10 will adapt computer 10 to perform various tasks including a method of accessing multiple display frame buffers described herein.

GUI operating system 16 operates relatively independently from the display hardware, which provides greater hardware compatibility, but does not provide a mechanism whereby GUI operating system 16 can distinguish between a single, continuous desktop coextensive with the monitor display area (screen) and an enhanced desktop. The illustrated desktop manager 20 is operationally interposed between operating system 16 and an application program 28 to provide various functions for managing graphical object display in the enhanced desktop environment. Desktop manager application 20 monitors and modifies messages that pass between the application program 28 and GUI operating system 16. The detailed operation of desktop manager application 20 is described in U.S. Pat. No. 5,835,090, which is assigned to the assignee of this application and incorporated herein by reference.

Accordingly, GUI operating system 16 may conventionally receive drawing instructions from an application program 28 and instruct graphics driver 18 to draw on the conventional desktop generated by GUI operating system 16 or the enhanced desktop generated by desktop manager application 20.

Alternatively GUI operating system 16 and application program 28 may include DirectX® components such that graphic chip 24 may directly receive drawing instructions from application program 28 and draw on the conventional desktop generated by GUI operating system 16, thereby accelerating single monitor drawing operations. However, as described in the background section, accelerated drawing to multiple monitors is error prone.

Therefore, alternatively and preferably, GUI operating system 16 and application program 28 include DirectX® components, and system 10 further includes a direct access driver 30 of this invention that directly receives drawing instructions from application program 28 and draws on the enhanced desktop generated by desktop manager application 20 and spanning monitors 12 and 14, thereby accelerating multiple monitor drawing operations.

Direct access driver 30 solves the multiple monitor limitations of DirectX as follows. As stated in the summary of the invention, display errors can occur if multiple frame buffer addresses are returned in response to "GetFrameBufferAddress" DirectX calls. Direct access driver 30 circumvents this problem by returning a single address for two or more frame buffers by performing background operations, without the knowledge of DirectX application program 28. The background operations track the demand for hardware acceleration from an enhanced desktop and multiple frame buffers, such as ones associated with graphics chips 24 and 26. The background tracking operations entail constantly changing the frame buffer pointers relative to the location of offscreen DirectX application data, while one or more DirectX applications are moved in the display space among monitors 24 and 26.

A preferred embodiment of this invention is described in C language source code program files named DDMulti.c and DDMulti.h, which are incorporated herein by reference and copies of which are provided in the above-described computer program listing appendix. In particular, refer to the functions named MultDDBlt( ) and MultDDLock.

To further illustrate, the MultDDBlt( ) is reproduced below in List I, where line numbers are added for ease of reference.

LIST 1

```
1.  //*********************************************************************
2.  //
3.  // FUNCTION: MulDDBlt( )
4.  //
5.  // DESCRIPTION:    Performs a bit-block transfer for Direct Draw.
6.  //
7.  //*********************************************************************
8.  DWORD
9.  MulDDBlt
10. (
11. PDD_BLTDATA                      pInput
12. )
13. {
14. MULTI_BOARD*                     pmb;
15. MULTI_BOARD*                     pmbBlt;
16. MDEV*                            pmdev;
17. DWORD                            dwRet;
18. RECTL                            rclBounds;
19. PAPPIAN_DD_SURFACE_DATA          pAppianDDSurfaceData = NULL;
20. DISPDBG((DDMULTI_DBG_LEVEL + DD_BLT_DBG_LEVEL,
         "MulDDBlt:Entry\n"));
21. //
22. //
23. //
24. if( pInput->lpDDSrcSurface != NULL )
25. {
26. pAppianDDSurfaceData = (PAPPIAN_DD_SURFACE_DATA)pInput-
         >lpDDSrcSurface->dwReserved1;
27. }
28. if( !gbMultiBoards )
29. {
30. PDEV*    ppdev = (PDEV*)pInput->lpDD->dhpdev;
31. //
32. // For Appian double buffered surfaces, adjust the pointer to the source memory buffer if
         necessary
33. //
34. if( ( pAppianDDSurfaceData ) &&
35. ( pAppianDDSurfaceData->bDoubleBuffered ) &&
36. ( pAppianDDSurfaceData->ulDoubleBufferedOffset ) )
37. {
38. pInput->lpDDSrcSurface->lpGbl->fpVidMem += (pInput->lpDDSrcSurface->lpGbl-
         >dwBlockSizeX / 2);
39. }
40. dwRet = (ppdev->pfhDDBlt( pInput ));
41. //
42. // For Appian double buffered surfaces, restore the pointer to the source memory buffer
         if
         necessary
43. //
44. if( (pAppianDDSurfaceData) &&
45. ( pAppianDDSurfaceData->bDoubleBuffered ) &&
46. ( pAppianDDSurfaceData->ulDoubleBufferedOffset ) )
47. {
48. pInput->lpDDSrcSurface->lpGbl->fpVidMem -= (pInput->lpDDSrcSurface->lpGbl-
         >dwBlockSizeX / 2);
49. }
50. //
51. // Update the 'Flip Buffer' flag for Appian Double Buffered surfaces
52. //
53. if( (pAppianDDSurfaceData ) &&
54. ( pAppianDDSurfaceData->bDoubleBuffered ) )
55. {
56. pAppianDDSurfaceData->bFlipBuffer = TRUE;
57. }
58. return    dwRet;
59. }
60. pmdev = (MDEV*) pInput->lpDD->dhpdev;
61. rclBounds = pInput->rDest;
62. //
63. // If we had to adjust the pitch of the primary surface that we reported back to the
         DDHAL, then set it
```

LIST 1-continued

```
64.  // back to the correct (single monitor) pitch here, before the first time we bit to the
        surface.
65.  //
66.  if( ( pInput->lpDDDestSurface->ddsCaps.dwCaps & DDSCAPS_PRIMARYSURFACE
        ) &&
67.  ( pInput->lpDDDestSurface->lpGbl->lPitch != glDisplayPitch ) )
68.  {
69.  pInput->lpDDDestSurface->lpGbl->lPitch != glDisplayPitch;
70.  }
71.  //
72.  // Determine if the destination of this bit is on the visible screen
73.  //
74.  if( ( !DDRAW_EXCLUSIVE MODE ) &&
75.  ( pInput->lpDDDestSurface->ddsCaps.dwCaps & DDSCAPS_PRIMARYSURFACE ) )
76.  {
77.  for( pmb = pmdev->pmb; pmb != NULL; pmb = pmb->pmbNext )
78.  {
79.  MULTI_BOARD*   pmbTemp = pmb;
80.  //
81.  // Determine if the destination rect is fully contained on a single monitor
82.  //
83.  if( bFindBoard( pmdev, &rclBounds, &pmbTemp ) )
84.  {
85.  if( pInput->lpDDSrcSurface )
86.  {
87.  //
88.  // BADBAD We use the DDraw 'LIVEVIDEO' flag to differentiate our Appian video
        port input
89.  //        buffers from other DDraw offscreen surfaces (because we don't report
        back to the
90.  //        DDHal as supporting 'LIVEVIDEO' . . . )
91.  //
92.  if( pInput->lpDDSrcSurface->ddsCaps.dwCaps & DDSCAPS_LIVEVIDEO )
93.  {
94.  pmbBlt = pmbTemp;
95.  goto blt;
96.  }
97.  else
98.  {
99.  //
100. // Determine if the last uploaded source buffer is on the current destination board of this
        surface.
101. //
102. if( pmbTemp->iBoard != pAppianDDSurfaceData->iBoard)
103. {
104. //
105. // Remap the user-mode frame buffer pointer for this process.
106. //
107. vDDReMapMemory( pInput->lpDD, pInput->lpDDSrcSurface, pmbTemp->iBoard );
108. //
109. // Source and destination are on different boards. Punt for now.
110. //
111. pInput->ddRVal = DD_OK;
112. return DDHAL_DRIVER_NOTHANDLED;
113. }
114. }
115. break;   // Continue and do the DDRAW bit.
116. }
117. }
118. //
119. // Destination rect is split across multiple monitors
120. //
121. else
122. {
123. //
124. // BADBAD We use the DDraw 'LIVEVIDEO' flag to differentiate our Appian video
        port input
125. //        buffers from other DDraw offscreen surfaces (because we don't report
        back to the
126. //        DDHal as supporting 'LIVEVIDEO' . . . )
127. //
128. if( (pInput->lpDDSrcSurface ) &&
129. ( pInput->lpDDSrcSurface->ddsCaps.dwCaps & DDSCAPS_LIVEVIDEO ) )
130. {
131. RECTL    rclBounds;
132. RECTL    rDest = pInput->rDest;
133. RECTL    rSrc = pInput->rSrc;
134. for( pmb = pmdev->pmb; pmb != NULL; pmb = pmb->pmbNext )
```

LIST 1-continued

```
135. {
136.    if( bIntersect( &rDest, &pmb->rcl, &rclBounds ) )
137.    {
138.        double     dblStretchRatioX,
139.                   dblStretchRatioY;
140.        dblStretchRatioX = (double)((double)(rDest.right − rDest.left) /
141.            ((double)(rSrc.right − rSrc.left)) );
142.        dblStretchRatioY = (double)((double)(rDest.bottom − rDest.top) /
143.            ((double)(rSrc.bottom − rSrc.top)) );
144.        pInput->rDest = rclBounds;
145.        //
146.        // Add our multi-mon surface offset to the destination rect
147.        //
148.        pInput->rDest.left += pmb->ppdev->ptlMultiOffset.x;
149.        pInput->rDest.right += pmb->ppdev->ptlMultiOffset.x;
150.        pInput->rDest.top += pmb->ppdev->ptlMultiOffset.y;
151.        pInput->rDest.bottom += pmb->ppdev->ptlMultiOffset.y;
152.        //
153.        // Our destination rect has been adjusted into a single monitor relative size (that
154.        // can be handled by the Permedia graphics engine.)
155.        // Adjust the source rect accordingly.
156.        //
157.        if( 1)//dblStretchRatioX >= 1.0 )
158.        {
159.            pInput->rSrc.left = rSrc.left +
160.                (LONG)((double)(rclBounds.left − rDest.left) /
161.                dblStretchRatioX);
162.            pInput->rSrc.right = pInput->rSrc.left +
163.                (LONG)((double)(pInput->rDest.right − pInput->rDest.left) /
164.                dblStretchRatioX);
165.        }
166.        if( 1)//dblStretchRatioY >= 1.0)
167.        {
168.            pInput->rSrc.top = rSrc.top +
169.                (LONG)((double)(rclBounds.top − rDest.top) /
170.                dblStretchRatioY);
171.            pInput->rSrc.bottom = pInput->rSrc.top +
172.                (LONG)((double)(pInput->rDest.bottom − pInput->rDest.top) /
173.                dblStretchRatioY);
174.        }
175.        pInput->lpDD->dhpdev = pmb->ppdev;
176.        dwRet = (pmb->ppdev->pfnDDBlt( pInput ));
177.    }
178.    }
179.    pInput->lpDD->dhpdev = pmdev;
180.    pInput->ddRVal = DD_OK;
181.    return DDHAL_DRIVER_HANDLED;
182. }
183. //
184. // This is a normal DDRAW app split between screens (not our video app). Punt for
            now.
185. //
186. else
187. {
188.    pInput->ddRVal = DD_OK;
189.    return DDHAL_DRIVER_NOTHANDLED;
190. }
191. }
192. }
193. }
194. //
195. // The destination of this bit is not on the visible screen
196. //
197. /* else
198. {
199.    // Offscreen to offscreen vid-mem bits (ala fox-bear sprites)
200. } */
201. //
202. // Get the correct device pointer for our bit
203. //
204. if( pAppianDDSurfaceData )
205. {
206.    for( pmbBlt = pmdev->pmb; pmbBlt != NULL; pmbBlt = pmbBlt->pmbNext )
207.    {
208.        if( pmbBlt->iBoard == pAppianDDSurfaceData->iBoard )
209.        break;
210.    }
211. }
```

LIST 1-continued

```
212. else
213. {
214.   pmbBlt = pmdev->pmbDDCurrent;
215. }
216. blt:
217. //
218. // Add our multi-monitor offsets to the destination rectangle
219. //
220. if( ( !DDRAW_EXCLUSIVE_MODE) &&
221.   ( pInput->lpDDDestSurface->ddsCaps.dwCaps & DDSCAPS_PRIMARYSURFACE ) )
222. {
223.   pInput->rDest.left   += pmbBlt->ppdev->ptlMultiOffset.x;
224.   pInput->rDest.right  += pmbBlt->ppdev->ptlMultiOffset.x;
225.   pInput->rDest.top    += pmbBlt->ppdev->ptlMultiOffset.y;
226.   pInput->rDest.bottom += pmbBlt->ppdev->ptlMultiOffset.y;
227. }
228. //
229. // For Appian double buffered surfaces, adjust the pointer to the source memory buffer if
          necessary
230. //
231. if( (pAppianDD SurfaceData ) &&
232.   ( pAppianDDSurfaceData->bDoubleBuffered ) &&
233.   ( pAppianDDSurfaceData->ulDoubleBufferedOffset ) )
234. {
235.   pInput->lpDDSrcSurface->lpGbl->fpVidMem += (pInput->lpDDSrcSurface->lpGbl-
           >dwBlockSizeX / 2);
236. }
237. //
238. // Call the DDBlt routine for the current DDraw channel
239. //
240. pInput->lpDD->dhpdev = pmbBlt->ppdev;
241. dwRet = (pmbBlt->ppdev->pfnDDBlt( pInput ));
242. //
243. // For Appian double buffered surfaces, restore the pointer to the source memory buffer
       if
          necessary
244. //
245. if( (pAppianDDSurfaceData ) &&
246.   ( pAppianDDSurfaceData->bDoubleBuffered ) &&
247.   ( pAppianDDSurfaceData->ulDoubleBufferedOffset ) )
248. {
249.   pInput->lpDDSrcSurface->lpGbl->fpVidMem -= (pInput->lpDDSrcSurface->lpGbl-
           >dwBlockSizeX / 2);
250. }
251. //
252. // Update the 'Flip Buffer' flag for Appian Double Buffered surfaces
253. //
254. if( (pAppianDDSurfaceData ) &&
255.   ( pAppianDDSurfaceData->bDoubleBuffered ) )
256. {
257.   pAppianDDSurfaceData->bFlipBuffer = TRUE;
258. }
259. pInput->lpDD->dhpdev = pmdev;
260. return   dwRet;
261. }
```

Some of the functions used in MultDDBlt( ) are defined in the function "DDInsertMultiLayerCallbacks", which is included in the source code "DDmulti" and is reproduced below in List II. Line numbers are added for ease of reference.

List II.

```
1. //*******************************************************************
2. //
3. // FUNCTION:    vDDInsertMultiLayerCallbacks
4. //
5. // DESCRIPTION: This function is called by our 'MulEnableDirectDraw' function.
6. //
7. //*******************************************************************
8. VOID
```

-continued

List II.

```
9.  vDDInsertMultiLayerCallbacks
10. (
11.     PDEV*                   ppdev,
12.     DD_CALLBACKS*           pCallBacks,
13.     DD_SURFACECALLBACKS*    pSurfaceCallBacks,
14.     DD_PALETTECALLBACKS*    pPaletteCallBacks
15. )
16. {
17. //
18. // Record the single monitor DDraw callbacks and return our "multi-layer" callbacks to the DDHAL
19. //
20. if(pCallBacks->dwFlags & DDHAL_CB32_MAPMEMORY)
21. {
22.     ppdev->pfnDDMapMemory = pCallBacks->MapMemory;
23.     pCallBacks->MapMemory = MulDDMapMemory;
24. }
25. if(pCallBacks->dwFlags & DDHAL_CB32_WAITFORVERTICALBLANK)
26. {
27.     ppdev->pfnDDWaitForVerticalBlank = pCallBacks->WaitForVerticalBlank;
28.     pCallBacks->WaitForVerticalBlank = MulDDWaitForVerticalBlank;
29. }
30. if(pCallBacks->dwFlags & DDHAL_CB32_CANCREATESURFACE)
31. {
32.     ppdev->pfnDDCanCreateSurface = pCallBacks->CanCreateSurface;
33.     pCallBacks->CanCreateSurface = MulDDCanCreateSurface;
34. }
35. if(pCallBacks->dwFlags & DDHAL_CB32_CREATESURFACE)
36. {
37.     ppdev->pfnDDCreateSurface = pCallBacks->CreateSurface;
38.     pCallBacks->CreateSurface = MulDDCreateSurface;
39. }
40. if(pCallBacks->dwFlags & DDHAL_CB32_GETSCANLINE)
41. {
42.     ppdev->pfnDDGetScanLine = pCallBacks->GetScanLine;
43.     pCallBacks->GetScanLine = MulDDGetScanLine;
44. }
45. //
46. // RECORD THE SINGLE MONITOR DDRAW SURFACE CALLBACKS AND REPLACE THEM WITH OUR MULTI LEVEL SURFACE CALLBACKS
47. //
48. if(pSurfaceCallBacks->dwFlags & DDHAL_SURFCB32_BLT)
49. {
50.     ppdev->pfnDDBlt = pSurfaceCallBacks->Blt;
51.     pSurfaceCallBacks->Blt = MulDDBlt;
52. }
53. if(pSurfaceCallBacks->dwFlags & DDHAL_SURFCB32_GETBLTSTATUS)
54. {
55.     ppdev->pfnDDGetBltStatus = pSurfaceCallBacks->GetBltStatus;
56.     pSurfaceCallBacks->GetBltStatus = MulDDGetBltStatus;
57. }
58. if(pSurfaceCallBacks->dwFlags & DDHAL_SURFCB32_FLIP)
59. {
60.     ppdev->pfnDDFlip = pSurfaceCallBacks->Flip;
61.     pSurfaceCallBacks->Flip = MulDDFlip;
62. }
63. if(pSurfaceCallBacks->dwFlags & DDHAL_SURFCB32_GETFLIPSTATUS)
64. {
65.     ppdev->pfnDDGetFlipStatus = pSurfaceCallBacks->GetFlipStatus;
66.     pSurfaceCallBacks->GetFlipStatus = MulDDGetFlipStatus;
67. }
68. if( pSurfaceCallBacks->dwFlags & DDHAL_SURFCB32_LOCK)
69. {
70.     ppdev->pfnDDLock = pSurfaceCallBacks->Lock;
71.     pSurfaceCallBacks->Lock = MulDDLock;
72. }
73. if(pSurfaceCallBacks->dwFlags & DDHAL_SURFCB32_UNLOCK)
74. {
75.     ppdev->pfnDDUnlock = pSurfaceCallBacks->Unlock;
76.     pSurfaceCallBacks->Unlock = MulDDUnlock;
77. }
78. if(pSurfaceCallBacks->dwFlags & DDHAL_SURFCB32_DESTROYSURFACE)
79. {
80.     ppdev->pfnDDDestroySurface = pSurfaceCallBacks->DestroySurface;
81.     pSurfaceCallBacks->DestroySurface = MulDDDestroySurface;
82. }
```

-continued

List II.

```
83. if(pSurfaceCallBacks->dwFlags & DDHAL_SURFCB32_UPDATEOVERLAY)
84. {
85.      ppdev->pfnDDUpdateOverlay = pSurfaceCallBacks->UpdateOverlay;
86.      pSurfaceCallBacks->UpdateOverlay = MulDDUpdateOverlay;
87. }
88. if(pSurfaceCallBacks->dwFlags &
    DDHAL_SURFCB32_SETOVERLAYPOSITION)
89. {
90.      ppdev->pfnDDSetOverlayPosition = pSurfaceCallBacks->SetOverlayPosition;
91.      pSurfaceCallBacks->SetOverlayPosition = MulDDSetOverlayPosition;
92. }
93. if(pSurfaceCallBacks->dwFlags & DDHAL_SURFCB32_SETCOLORKEY)
94. {
95.      ppdev->pfnDDSetColorKey = pSurfaceCallBacks->SetColorKey;
96.      pSurfaceCallBacks->SetColorKey = MulDDSetColorKey;
97. }
98. }
```

Briefly, the MulDDblt( ) function can be called when a request has been made for invoking a single device specific function for bit block transfer from a source block of a drawing surface to a single frame buffer of a display device. For example, the single device specific function can be a blit function provided by a device driver specific to the display device. The device specific blit function can be a conventional blit function for block transferring data to a frame buffer. Implementation and operation of a conventional blit function specific to a display device can be readily understood by those skilled in the art. While both the single device specific blit function and the MulDDblt( ) function can be used for block transferring data to a frame buffer, the MulDDblt( ) function can be conveniently used for block transferring data to multiple frame buffers, as will become clear below. The device driver can control access to multiple frame buffers. A pointer, "pInput", identifies the source and destination data and is passed to the MulDDblt( ) function as the parameter of the call, "pInput", as can be seen at lines 9 to 12. The data or parameters passed by the all, directly or indirectly, include pointers to the source ("DdsrcSurface", see e.g. line 24) and the destination ("DDDestSufrace", see e.g. line 66). Also passed by the call are coordinates identifying or specifying the source block in the source ("rSrc"), and the coordinates of the original destination block ("rDest") in the destination. As is conventional, memory blocks for drawing surfaces and frame buffers are rectangles specified or identified by their top, left, bottom and right coordinates. Further, in the following description, it is assumed that the frame buffers of the multiple monitors form a virtual destination surface and the location of a particular frame buffer in that virtual destination surface is specified by a set of offsets, which specify the frame buffer's starting coordinates. As can be understood, the pointers to, and the coordinates of, the memory block are identifiers identifying the data to be transferred.

In response to receiving the request, i.e., when the MulDDblt function is called, it determines whether the identified source block is to be transferred to one or more of a plurality of available frame buffers. This determination is performed, for example, at lines 28, 74-75, 83, 85, 128, 129, 136, 220, and 221. For instance, at line 28 it is determined if multiple frame buffers are available and at line 83 it is determined if the destination block can be fully contained in a single frame buffer for a monitor.

For each particular frame buffer to which data is to be transferred, e.g. as illustrated by the loop starting at line 134, a determination is made as to which portion or sub-block of the identified source block is to be transferred to the particular frame buffer; it is also determined wherein in the particular frame buffer the sub-block of the source block is to be transferred, i.e., the destination block in that particular frame buffer.

For example, at line 136, a function ("bIntersect") is called to determine if the originally proposed destination block of the source block intersects the particular frame buffer. If there is no intersection at all, then no data is to be transferred to the particular buffer. If there is intersection but there is no crossing over the boundary of the frame buffer, then the entire source block can be transferred to the particular buffer. If there is crossing over the boundary of the frame buffer, then only a sub-block of the source block is to be transferred to the intersected portion of the particular frame buffer. As can be seen at line 144, the designation block for the current frame buffer equals the returned intersected block ("rclBounds") from the "bIntersect" call. "rclBounds" includes a set of coordinates specifying starting and ending locations of the original destination block in the destination surface, which is in a sense a virtual surface as it is formed by all available frame buffer but is not a real surface.

As can be understood from lines 148 to 151, if the particular frame buffer has a non-zero offset, then the destination block's coordinates need to be adjusted, according to the offsets of the particular frame buffer. Similar offset adjustment is also performed at lines 223 to 226. As can be appreciated, the final set of coordinates specifying the starting and ending locations of the destination block ("rDesct") in the particular frame buffer is obtained by subtracting the offsets for the particular corresponding frame buffer from the set of coordinates of original destination block within the particular frame buffer (i.e., "rclBounds").

The source block and the initial designation block may have the same size and shape or different size or shape. When they are different, additional adjustment may be made by stretching or shrinking the size of the designation block in one or two dimensions, as are performed at lines 138 to 144.

Once the sub-block of the source block and the offset destination block have been determined, a call to invoke the single device specific function ("pfnDDBlt( pInput)") is made at line 176, or 241. Therefore, when the source block needs to be transferred to more than one frame buffer, the same device specific function is invoked multiple times to write at least portions of the source block to all of them.

The sample code also includes segments for dealing with double-buffered source surface and destination surfaces, such as at lines 42 to 57.

As can be understood, the source block may be completely or partially transferred to one or more of the available frame buffers. When the source block is transferred to only one of the available frame buffers, it may include only one sub-block.

Portions of the appended source code program files contain material which is subject to copyright protection. The copyright owner has no objection to the facsimile reproduction by anyone of the patent document or the patent disclosure, as it appears in the Patent and Trademark Office file or. records, but otherwise reserves all copyright rights whatsoever.

In addition to providing hardware accelerated DirectX operation across multiple monitors in windowed mode, direct access driver 30, in conjunction with desktop manager application 20, further provides user selection of which monitor will display accelerated DirectX applications running in exclusive mode. This user selection informs direct access driver 30 which monitor the DirectX application should display on and returns the corresponding frame buffer address in response to "GetFrameBufferAddress" calls.

Direct access driver 30 is beneficial to DirectX applications that are not multiple-monitor aware, employ direct frame buffer access, and are programmed for DirectX 3.0 or later include. Such applications include ActiveMovie, ProShare Video Conferencing, and numerous game and video packages. Users of these DirectX applications include financial traders viewing broadcast video on the desktop, users of video conferencing, users viewing streaming video over the Internet, and DirectX gamers. Direct access driver 30 is available from the assignee of this application as a software product named "AppianDX™."

Table 1 shows multiple monitor system configurations under which DirectX display is problematical. In configurations indicating "Problems," AppianDX is advantageous for hardware acceleration of DirectX applications across multiple monitors without errors or application program 28 performance degradation.

TABLE 1

| DirectX version > Operating System | DirectX 3.0 | DirectX 5.0 | DirectX 6.0 and standard DirectX application | DirectX 6.0 and multiple-monitor aware DirectX application |
|---|---|---|---|---|
| Windows 95 | Problems | Problems | Problems | Problems |
| Windows NT 4.0 | Problems | Not Supported | Not Supported | Not Supported |
| Windows 98 | Problems | Problems | Problems | Okay |

Skilled workers will recognize that portions of this invention may be implemented differently from the implementations described above for a preferred embodiment without departing from the underlying principles thereof. The scope of this invention should, therefore, be determined only by the following claims.

I claim:

1. A method of accessing multiple display frame buffers of one or more graphics adapters in a computer system, said computer system executing a software driver controlling access to said multiple frame buffers, said software driver providing a single device specific function to be used by applications for block transferring data from a source block to an identified frame buffer address, said method comprising:
   receiving a request for invoking said single device specific function to transfer an identified source block to an identified frame buffer address;
   in response to receiving said request, determining that said identified source block is to be transferred to a plurality of said multiple frame buffers, wherein said plurality of frame buffers form a virtual destination surface, each one of said plurality of frame buffers associated with a pair of offsets specifying its starting location in said virtual destination surface; and
   for each one of said plurality of frame buffers,
   a) determining a sub-block of said source block, and a destination block in said each frame buffer for said sub-block, wherein each one of said destination blocks is a rectangular block and said determining said destination block comprises:
      (i) obtaining a first set of coordinates specifying starting and ending locations of said destination block in said virtual destination surface,
      (ii) obtaining a second set of coordinates specifying starting and ending locations of said destination block in said each frame buffer, by subtracting the offsets for said each frame buffer from said first set of coordinates; and
   b) calling said single device specific function of said software driver to transfer said sub-block to said destination block in said one of said plurality of frame buffers.

2. The method of claim 1, wherein a sub-block and its corresponding destination block have different shapes.

3. The method of claim 1, wherein said source block comprises one sub-block.

4. The method of claim 1, wherein said source block is completely transferred to said plurality of frame buffers.

5. The method of claim 1, wherein said source block is incompletely transferred.

6. The method of claim 1, further comprising determining said plurality of frame buffers.

7. The method of claim 1, wherein said source block is from a primary or secondary buffer of a double-buffered source surface.

8. Computer readable medium storing computer software that when loaded at a computing device, adapt said computing device to perform the method of claim 1.

9. The method of claim 1, wherein one of said plurality of buffers is associated with a pair of offsets that is not (0,0).

10. A computer system comprising one or more graphics adapters having multiple display frame buffers, said computer system storing and executing a software driver controlling access to said multiple frame buffers, said software driver providing a single device specific function to be used by applications for block transferring data from a source block to an identified frame buffer address, said computer system further storing and executing computer executable instructions adapting said computer system to:
   receive a request for invoking said single device specific function of said software driver to transfer an identified source block to an identified frame buffer address;

in response to receiving said request, determine that said identified source block is to be transferred to a plurality of said multiple frame buffers, wherein said plurality of frame buffers form a virtual destination surface, each one of said plurality of frame buffers associated with a pair of offsets specifying its starting location in said virtual destination surface; and for each one of said plurality of frame buffers, a) determine a sub-block of said source block, and a destination block in said each frame buffer for said sub-block, wherein each one of said destination blocks is a rectangular block by:

(ii) obtaining a first set of coordinates specifying starting and ending locations of said destination block in said virtual destination surface, (ii) obtaining a second set of coordinates specifying starting and ending locations of said destination block in said each frame buffer, by subtracting the offsets for said each frame buffer from said first set of coordinates; and b) call said single device specific function of said software driver to transfer said sub-block to said destination block in said one of said plurality of frame buffers.

* * * * *